United States Patent
Schmidt et al.

(10) Patent No.: US 7,321,822 B2
(45) Date of Patent: Jan. 22, 2008

(54) DEVICE AND METHOD FOR ESTIMATION OF AN ENGINE TORQUE

(75) Inventors: Thorsten Schmidt, Braunschweig (DE); Winfried Schultalbers, Meinersen (DE); Henning Rasche, Gaimersheim (DE); Hermann Fehrenbach, Rulzheim (DE); Kurt Bluhm, Neckarsulm (DE); Carsten Hohmann, Wedelheime (DE)

(73) Assignee: Audi AG, Ingolstadt (DE)

( * ) Notice: Subject to any disclaimer, the term of this patent is extended or adjusted under 35 U.S.C. 154(b) by 114 days.

(21) Appl. No.: 10/536,556

(22) PCT Filed: Nov. 5, 2003

(86) PCT No.: PCT/EP03/12317

§ 371 (c)(1),
(2), (4) Date: Mar. 6, 2006

(87) PCT Pub. No.: WO2004/051212

PCT Pub. Date: Jun. 17, 2004

(65) Prior Publication Data

US 2006/0142929 A1 Jun. 29, 2006

(30) Foreign Application Priority Data

Nov. 29, 2002 (DE) .............................. 102 56 106

(51) Int. Cl.
*G01M 15/05* (2006.01)
*G01L 3/00* (2006.01)

(52) U.S. Cl. ..................................................... 701/114
(58) Field of Classification Search ................ 701/114, 701/110, 102, 115; 123/435; 73/117.3
See application file for complete search history.

(56) References Cited

U.S. PATENT DOCUMENTS 5,501,109 A    3/1996   Naito et al.
5,722,359 A * 3/1998   Chubachi et al. ......... 123/192.2

FOREIGN PATENT DOCUMENTS

| DE | 44 45 684 A1 | 12/1994 |
|---|---|---|
| DE | 199 31 985 A1 | 7/1999 |
| DE | 101 07 892 A1 | 2/2001 |
| EP | 0 445 339 A1 * | 9/1991 |
| EP | 0 608 676 A1 | 1/1993 |
| EP | 0 985 919 A1 * | 3/2000 |
| EP | 1 058 108 A2 | 12/2000 |
| EP | 1 058 108 A3 | 7/2002 |
| GB | 2 168 819 A | 6/1986 |

* cited by examiner

*Primary Examiner*—Hieu T. Vo
(74) *Attorney, Agent, or Firm*—Stevens, Davis, Miller & Mosher, LLP

(57) ABSTRACT

Alternating torque $\tilde{M}_{kv}(\phi)$ or the mean indicated pressure $P_{ml}$ is to be determined from the angular velocity $\omega$ from the engine speed, for engine management, for example. Charge pressure compensation (5) must be effected in order for a usable result to be obtained. By preference sensor wheel error compensation (2) and inertial force compensation (4) are also effected. The mean indicated pressure $P_{ml}$ is obtained from the alternating torque $\tilde{M}_v(\phi)$ in a characteristic diagram.

15 Claims, 1 Drawing Sheet

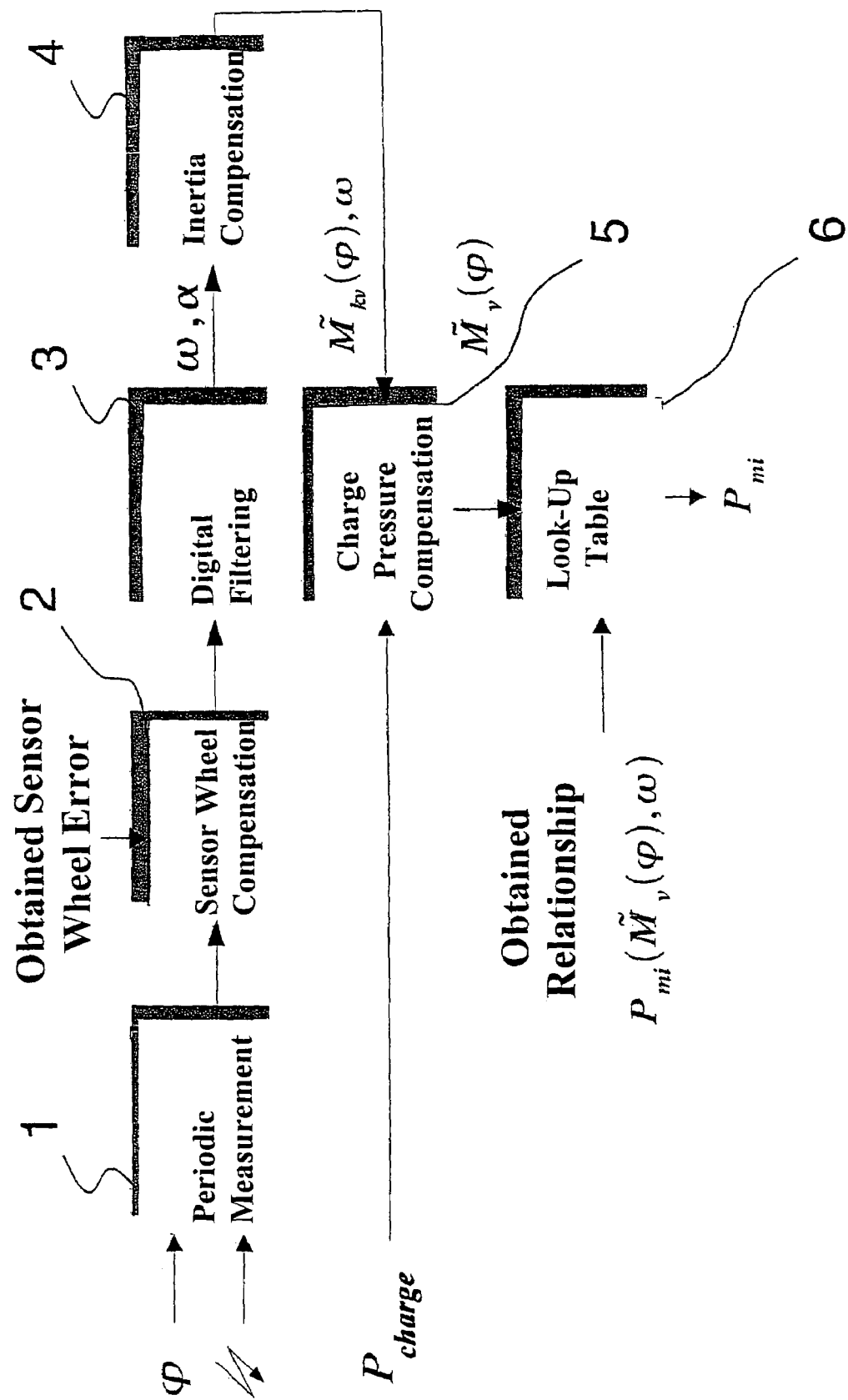

DEVICE AND METHOD FOR ESTIMATION OF AN ENGINE TORQUE

This application is a § 371 application of PCT/EP03/12317, which claims priority from DE 10256106.0, filed Nov. 29, 2002.

BACKGROUND

This invention relates to a method for determination of the torque of an internal combustion engine. The invention also relates to a device suitable for determination of the torque.

Torque is a central quantity in drive management in internal combustion engines. For reasons of cost a sensory mechanism is not built into mass-produced vehicles for determination of engine torque. Consequently, the engine timing gear has no remote indication of the torque actually generated by the engine. However, knowledge of engine torque would afford a number of advantages. For example, if torque control could be effected, compensation for disturbance variables could be made by very simple means. Costly control functions in engine management could be replaced by a simple control algorithm.

A process for determining torque, operating processes, and power in internal combustion engines has been disclosed in German patent application DE 44 45 684 C2. The moment of inertia of the rotating masses being taken into account and compensation being made for the torque of oscillating masses, the resulting torque is calculated by means of a characteristic diagram of an engine. This characteristic diagram is determined by experiments at different engine speeds and load stages. The actual torque may then be calculated by means of the characteristic diagram as thus determined on the basis of angular velocity measurements and, after further processing, the fuel-torque pattern is indicated by the crank angle.

Determination of the torque is complicated by various actuating variables depending on the engine and the operating point. These actuating variables must be recognized, allowance must be made for them in suitable form, and compensation must be made for them.

SUMMARY OF THE INVENTION

The object of this invention accordingly consists in taking essential actuating variables into account when determining engine torque.

The invention is attained by a method for determining the torque of an internal combustion engine by acquiring a first measured variable relating to an angular velocity of the internal combustion engine, acquisition of a second measured variable relating to a charge pressure of the internal combustion engine or simulation of a charge pressure value as a function of the first measured variable, and determination of the torque from the first measured variable and the second measured variable or from the first measured variable and the simulated charge pressure value.

In addition, the invention is attained by means of a device for determination of torque of an internal combustion engine having a first sensor mechanism for acquisition of a first measured variable relating to the angular velocity of the internal combustion engine, a second sensor mechanism for acquisition of a second measured variable relating to the charge pressure of the internal combustion engine or a mechanism for simulation of a charge pressure value as a function of the first measured variable, and a data processing mechanism which is connected to the first and second sensor mechanisms or to the first sensor mechanism and the simulation mechanism for determination of torque from the first measured variable and the second measured variable or from the first measured variable and the simulated charge pressure value.

As a result, torque is reliably estimated even with supercharged engines. Because of the greater cylinder charging, the supercharging results in a wider fuel-alternating torque amplitude. Transient processes in particular may lead to problems with controlled turbochargers. The same charge pressure does not always prevail in operation in these instances as in the case of a characteristic diagram of the corresponding speed-load combination plotted under stationary conditions. A different alternating torque, and accordingly a false load point, are determined in the characteristic diagram in this instance as a result of the different charge pressure. Consequently, it is necessary in determination of the load moment to render both the corresponding diagram and the estimated alternating torque as input variable independent of the charge pressure. The alternating torque pattern must for this purpose be freed from its charge pressure dependent component. The information from the charge pressure sensor generally present may be used for estimation of the compression component. If the basic pattern of the charge pressure is simulated on the basis of the angular velocity by means of a suitable model, this simulated charge pressure value may then also be used for calculation of torque or for compensation of charge pressure.

The dependence on atmospheric pressure is also eliminated by compensation for the charge pressure. This dependence might otherwise result in variations in estimation of torque in high-altitude operation.

The speed of rotation or angular velocity of the crankshaft of the internal combustion engine is determined preferably by means of a sensor wheel. A sensor wheel having marks or segments is for this purpose mounted on the crankshaft so as to be nonrotatable. A stationary sensor scans the sensor wheel. This represents a relatively rugged measurement method.

Manufacturing tolerances for the sensor wheel and errors in installation of the crankshaft result in sensor wheel errors which should be offset in determination of the torque. In addition, the angular velocity as measured should be free of disturbing signals during determination of the torque. By preference this is accomplished by means of digital filtering.

It is also advantageous for the forces of inertia which occur during rotation of the components of the internal combustion engine to be compensated. In this way conversion of energy may be determined independently of the oscillating masses of the engine.

Lastly, in order to obtain an output variable more or less independent of the engine, the torque in relation to the piston displacement of the internal combustion engine may be scaled by means of a characteristic diagram. An averaged pressure value may be obtained as a result, a value by means of which the energy conversion of engines with different piston displacements may be compared.

The alternating torque as determined may be applied to advantage to the motor vehicle safety concept.

BRIEF DESCRIPTION OF THE DRAWINGS

The present invention will now be described in greater detail below with reference to the accompanying drawing, which represents a block diagram of the process claimed for the invention.

DETAILED DESCRIPTION OF THE INVENTION

The exemplary embodiment described below represents only a preferred embodiment of this invention.

The diagram of the drawing shows how the mean indicated pressure may be inferred from an angular velocity ω of the crankshaft and accordingly the energy conversion in an internal combustion engine may be evaluated. Periodic measurement is made in a block 1 for determination of the angular velocity. The raw signal of an angular velocity in particular is determined from the duration of a specific differential angle.

The raw angular velocity signal undergoes sensor wheel compensation in block 2. High-precision determination of the crankshaft speed is a prerequisite for flawless estimation of torque. However, the sensor wheels employed in angular velocity measurement are afflicted to some extent by considerable errors such as off-center mounting and/or tooth pitch errors. Deviations such as these lead to unacceptable errors in determination of the angular velocity and consequently of the alternating torque determined from them.

Two suitable compensation processes have been disclosed for sensor wheel compensation. The first process of sensor wheel adaptation, disclosed in German patent application 102 17 560.8, makes use of the phase opposition of the gas and mass moments for determination of the geometric errors of the shaft encoder wheel employed. The advantage of this process lies in the simplicity of its application and in the fact that no a priori knowledge of the engine to be examined is required other than the number of cylinders and gear teeth. The second process, described in patent application publication DE 101 07 892 A1, selects an equation of modeling of crankshaft energy for determination of the sensor wheel error. The error caused by the sensor wheel may be reduced by at least one order of magnitude by adaptation of the sensor wheel. Reference is hereby made expressly to these two documents.

As is indicated symbolically in the drawing by the entrance arrow in block 2, the sensor wheel error for each engine must be registered only once in advance and then stored. Consequently, output signal of block 2 is a sensor-wheel compensated angular velocity.

The corrected angular velocity is highly interference-prone. It is marked by a small signal-to-noise ratio. What is essentially band limitation is effected in block 3 by digital filtering in order to improve this situation. The result is a filtered angular velocity signal ω with an improved signal-to-noise ratio. In addition, angular acceleration α is calculated from the filtered angular velocity signal in block 3 by means of differentiation.

Inertial force compensation subsequently effected in block 4 has the result that the momentum effect is compensated by the inertial moments and oscillating masses and thus the pure gas alternating torque is determined. The moments deriving from inertial forces and acting on the crankshaft have the effect of disproportionate angular velocity and so must be compensated. As has been pointed out, inertial moments of this nature are made up of the mass inertia of the rotating parts and the oscillating piston and connecting rod. A moment $\tilde{M}_{k_v}(\phi)$ dependent on the charge pressure is obtained as output signal.

Variations in charge pressure are compensated in block 5. The information $P_{[charge]}$ from the charge pressure sensor may be used to estimate the proportion of compensation. The dependence of the alternating torque on the charge pressure may be expressed in the form of a previously plotted characteristic curve. Measurements of variation in charge pressure or discharge measurements are made for this purpose. Such measurements yield an approximately linear characteristic not dependent on engine speed. This charge pressure compensation effected in accordance with the charge pressure characteristic determined frees the alternating torque as obtained from its component resulting from the charge pressure and an appropriate moment $\tilde{M}_v(\phi)$ is obtained. The process may thus be applied for supercharged engines as well.

The aim of the torque measurement process is determination of the indicated medium pressure $P_{ml}$ or of the effective medium pressure and the load moment. The quantity desired is estimated from the measured input quantity or angle and the alternating torque by way of a characteristic field registered in advance for every engine type (symbolized as block 6 in the drawing). The relationship among alternating torque $\tilde{M}_v(\phi)$, speed ω, and mean indicated pressure $P_{ml}$ is described in this characteristic field.

Departures from a measured reference value within the range of one to ten percentage points occur in verification of the accuracy of the alternating torque estimation from the charge pressure and the angular velocity. Departures in estimation of mean indicated pressures $P_{ml}$ determined on the basis of dynamic measurements also fall within the range of one to ten percentage points. Values estimated with such precision may be employed to advantage for engine and gear management.

The invention claimed is:

1. A device for determination of torque of an internal combustion engine, said device comprising
   a first sensor mechanism for acquisition of a first measured variable relating to angular velocity of the internal combustion engine,
   a second sensor mechanism for acquisition of a second measured variable relating to charge pressure of the internal combustion engine or a simulation mechanism for simulation of a charge pressure quantity as a function of the first measured variable and
   a data processing mechanism connected to the first and second sensor mechanisms or to the first sensor mechanism and to the simulation mechanism for determination of torque from the first measured variable and the second measured variable or from the first measured variable and the simulated charge pressure variable.

2. The device as claimed in claim 1, wherein the first sensor mechanism has a sensor wheel by means of which an angular velocity may be acquired as first measured variable.

3. The device as claimed in claim 1, wherein the data processing mechanism comprises a compensation mechanism for compensation of a sensor wheel error.

4. The device as claimed in claim 1, wherein the data processing mechanism comprises a filter unit for filtering the first measured variable in relation to the speed for reduction of disturbances.

5. The device as claimed in claim 1, wherein the data processing mechanism comprises a compensation unit for compensation of inertial forces which arise in rotation of the internal combustion engine as a result of the oscillating components of such forces.

6. The device as claimed in claim 1, wherein the charge pressure may be taken into account in the data processing mechanism by way of a characteristic.

7. The device as claimed in claim 6, wherein the characteristic is linear and in particular may be acquired by way of charge pressure measurement or discharge measurements.

8. A method for determination of the torque of an internal combustion engine, said method comprising
- measuring a first variable relating to an angular velocity of the internal combustion engine,
- measuring a second variable, wherein said second variable relates to one of:
  - a charge pressure of the internal combustion engine and
  - simulation of a charge pressure value on the basis of the first variable; and
- calculating said torque from said first variable and one of said second variable and said simulation of a charge pressure value.

9. A method for determining torque of an internal combustion engine comprising:
- acquiring a first measured variable relating to an angular velocity of an internal combustion engine,
- acquiring a second measured variable relating to a charge pressure of the internal combustion engine or simulation of a charge pressure value on the basis of the first measured variable and
- determining the torque from the first measured variable and the second measured variable or from the first measured value and the simulated charge pressure value.

10. The method as claimed in claim 9, wherein said first measured variable is an angular velocity, and said acquiring of a first measured variable comprises operating a sensor wheel.

11. The method as claimed in claim 10, wherein a sensor wheel error is compensated in determination of the torque.

12. The method as claimed in claim 9, further comprising filtering the first measured variable relating to the speed to reduce disturbances in determination of the torque.

13. The method as claimed in claim 9, further comprising compensating for inertial forces caused in rotation of the internal combustion engine by the components of such internal combustion engine.

14. The method as claimed in claim 9, further comprising considering the charge pressure by way of a characteristic.

15. The method as claimed in claim 14, wherein the characteristic is linear and is obtained in particular by charge pressure variation measurements or discharge measurements.

* * * * *

UNITED STATES PATENT AND TRADEMARK OFFICE
CERTIFICATE OF CORRECTION

| | |
|---|---|
| PATENT NO. | : 7,321,822 B2 |
| APPLICATION NO. | : 10/536556 |
| DATED | : January 22, 2008 |
| INVENTOR(S) | : Thorsten Schmidt et al. |

It is certified that error appears in the above-identified patent and that said Letters Patent is hereby corrected as shown below:

Claim 1, col. 4, line 30-46; claim 8, col. 5, lines 1-12; and claim 9, lines 12-24

Have commas instead of semi-colons after each paragraph.

After each paragraph, delete the commas to insert semi-colons.

Signed and Sealed this

Twenty-sixth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,321,822 B2
APPLICATION NO. : 10/536556
DATED : January 22, 2008
INVENTOR(S) : Thorsten Schmidt et al.

It is certified that error appears in the above-identified patent and that said Letters Patent is hereby corrected as shown below:

Col. 4, line 31 reads: "combustion engine, said device comprising" and should read: "combustion engine, said device comprising:"

Col. 5, line 2 reads: "combustion engine, said method comprising" and should read: "combustion engine, said method comprising:"

At Col. 4, line 34, reads: "nal combustion engine," and should read "nal combustion engine;" (removing the comma, adding the semicolon)

At Col. 4, line 39, reads "tion of the first measured variable and" and should read "tion of the first measured variable; and" (adding semicolon)

At Col. 5, line 4, reads "of the internal combustion engine," and should read "of the internal combustion engine;" (removing the comma, adding the semicolon)

At Col. 5, line 16, reads "velocity of an internal combustion engine," and should read "velocity of an internal combustion engine;" (removing the comma, adding the semicolon)

At Col. 5, line 20, reads "measured variable and" and should read "measured variable; and" (adding semicolon)

Signed and Sealed this

Thirtieth Day of June, 2009

JOHN DOLL
*Acting Director of the United States Patent and Trademark Office*